May 13, 1958 K. H. HIGGINS 2,834,607
SAFETY BELT ASSEMBLY FOR AUTOMOBILES
Filed Nov. 7, 1955 2 Sheets-Sheet 1

K. H. HIGGINS
INVENTOR.

BY
ATTORNEYS

May 13, 1958 K. H. HIGGINS 2,834,607
SAFETY BELT ASSEMBLY FOR AUTOMOBILES
Filed Nov. 7, 1955 2 Sheets-Sheet 2

K. H. HIGGINS
INVENTOR.

BY E. C. McRae
J. R. Faulkner
D. H. Oster
R. T. Seeger
ATTORNEYS

United States Patent Office 2,834,607
Patented May 13, 1958

2,834,607
SAFETY BELT ASSEMBLY FOR AUTOMOBILES

Kenneth H. Higgins, Pontiac, Mich., assignor to Ford Motor Company, Dearborn, Mich., a corporation of Delaware Application November 7, 1955, Serial No. 545,259

2 Claims. (Cl. 280—150)

For many years it has been known that the use of safety belts in automobiles and other motor vehicles would lessen the chances of injury in the event of a collision at certain vehicle speeds. However, due to the problems involved in installing a rigid, relatively inexpensive, dependable attractive safety belt assembly the use of such assembly was very limited. This invention which relates to safety belt assemblies and more particularly to automobile seat safety belt assemblies is significant because it provides a rigid easily installed, inexpensive, dependable and detachable safety belt means.

It is an object, therefore, of the invention to provide an assembly of the kind described which may be installed in an automobile in a short period of time. It is a further object of this invention to standardize a rigid dependable fitting in an automobile that lends itself to quick non-skilled installation of a semi-permanent nature. It is still another object of this invention to provide a safety belt assembly permitting a safety belt to be detachable as desired. Another object of this invention is to provide a safety belt assembly in which the mountings when the belt is detached will be relatively attractive and not protrude from the automobile floor or wall. An object of this invention is to provide an assembly of the kind mentioned with a mounting base which is firmly anchored to the automobile frame thereby preventing any undesirable relative movement of the belt mounting to the frame. It is a further object of this invention to provide a mounting whereby a safety belt shoulder harness may be easily and quickly installed and detached, and with said shoulder harness utilizing the same mountings as said seat belt. Another object of this invention is to provide a safety belt assembly that is designed so that the force component on the mountings are such that even under severe impact, said mountings while comparatively light will not yield.

Other important features and objects of the invention to which reference has not been made hereinabove will appear hereinafter when the following description and claims are considered with the accompanying drawings in which:

Figure 1:
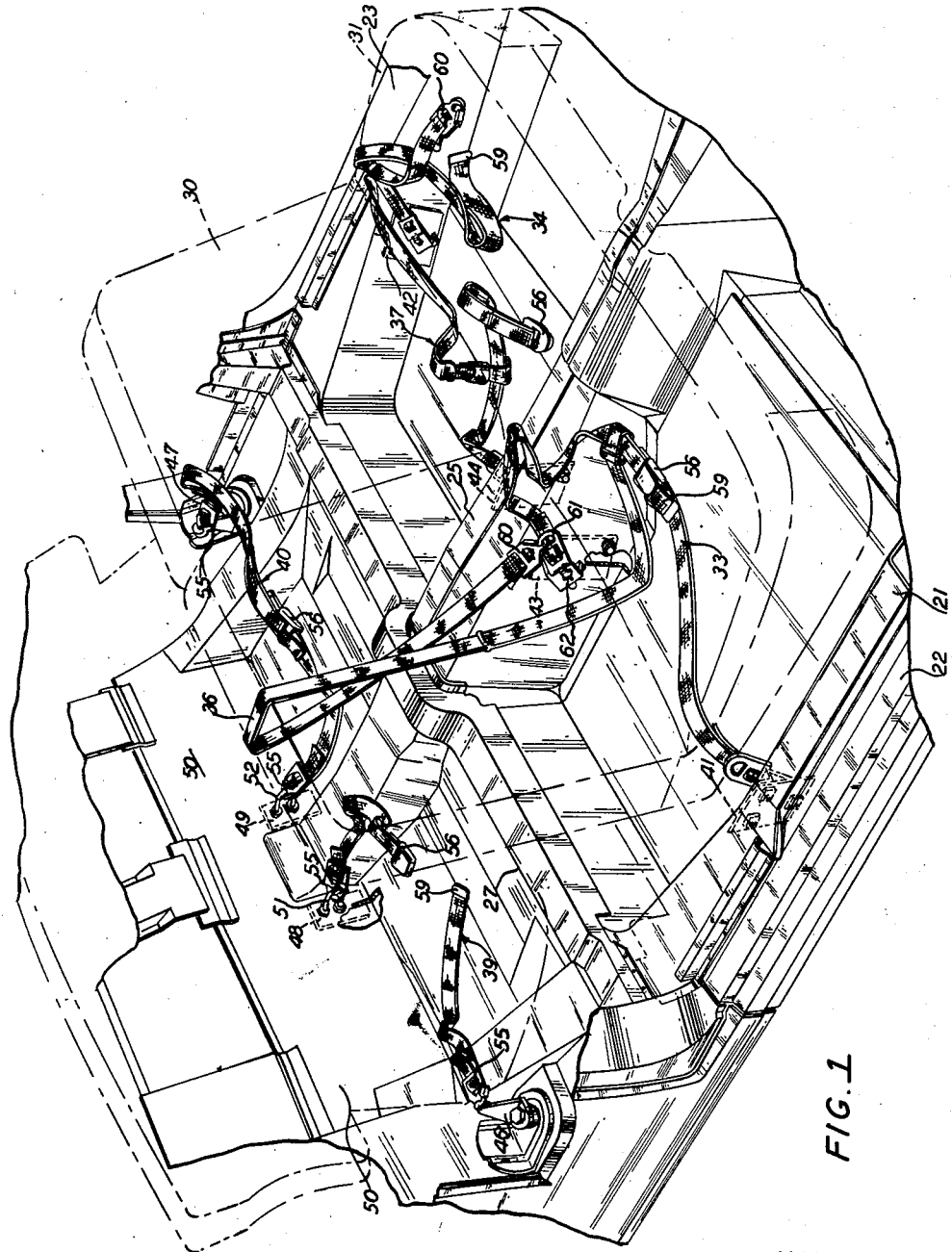
Figure 1 is a partially cutaway perspective view of an automobile frame with seat safety belts and shoulder harnesses attached thereto.

In Figure 1 is the automobile floor panel 21 which forms a substantially continuous cover for the automobile frame and the frame members. Floor panel 21 is of the conventional kind and is attached at either side to side frame rails 22, 23. Tunnel 25 extends through the center of the automobile chassis frame and provides the housing for the drive shaft and accompanying parts. Cross member 27 which is positioned underneath the rear seat of the automobile is of the kind used for automobile frame supports. Back rest 30 and front seat 31 are represented in dashed lines, in their approximate positions in the automobile and in relation to the automobile frame. Front seat belt assemblies 33, 34 are shown respectively in a fastened and unfastened condition. Shoulder harnesses 36, 37 are shown respectively in an attached and unattached position. Rear seat belts 39, 40 are shown respectively in an unfastened and fastened position. Front seat belt mountings 41, 42 are attached to the side frame rail floor panel while mountings 43, 44 are attached to the floor panel tunnel sides. Rear mountings 46, 47 are attached directly to the outer side frame construction while inner-mountings 48, 49 are attached to trunk plate 50. A portion of trunk plate 50 is cutaway to show that mounting brackets 48, 49 are behind the plate on the side opposite to that from which the force is applied. Two mounting brackets 48, 49 are fastened to U bolts 51, 52. U bolts 51, 52 extend through trunk plate 50 and are bolted or otherwise connected to bracket mounting 48, 49. In this manner, a secure mounting is obtained that is unlikely to loosen or yield upon impact or sudden force.

Figure 4:
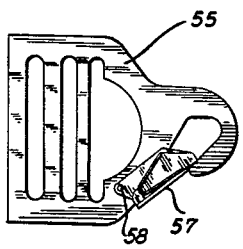
Figure 4 is a plan view of a spring type clip.

Mounting 46, 47 has an upright portion which has a ring-like part to which the ends of the safety belt may be attached. Mountings 46, 47, 48, 49 while all being securely fastened to the automobile frame have but a small exposed portion which design offers easy installation and detachment of safety belt connectors 55. Connectors 55 also shown in Figure 4 have spring urged member 57 pivoted about pivot 58 which opens only inwardly thereby allowing installation of these connectors on the safety belt mounting by merely engaging the spring urged member with the connecting portion of the mounting and snapping into place. However, to detach the belt the spring urged member must be manually depressed thereby preventing accidental disengagement.

Seat belt fastener 56 comprises a four-sided frame with a cover pivoted thereto. Belt tab 59 is inserted from beneath and through the frame and then reversed and drawn in a tightening direction whereupon the cover which has a knurled portion therebeneath which cooperates with said frame may be clamped upon the belt holding it securely. Said cover may be spring urged or not as is desired.

Shoulder harness connectors 60 are similar to connectors 55. Connectors 60 clip on to arcuate portions 63 of connector 61 which has T-shaped connecting portion 62. The opposite ends of shoulder harness 36 is looped about seat belts 33, 34 and slidably engaged therewith allowing adjustment to the desires of the operator. Only one shoulder harness is shown in position on the left front seat although it is anticipated that two will be used with each individual seat belt assembly.

Figure 2:
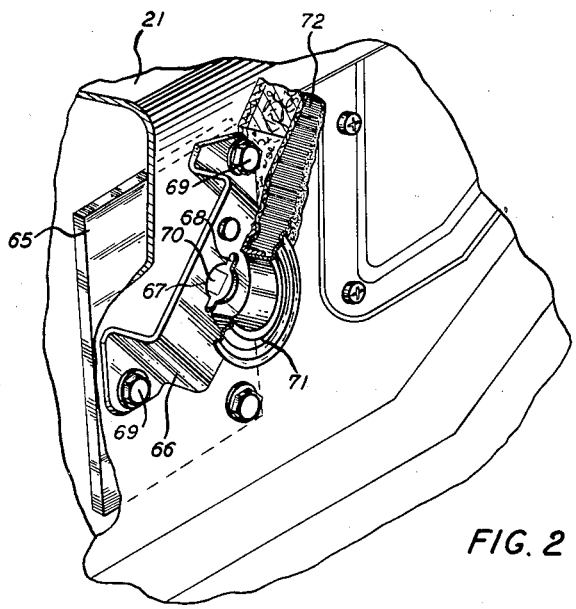
Figure 2 is an enlarged perspective partially cutaway view of an embodiment of safety belt mounting of this invention.
Figure 3:
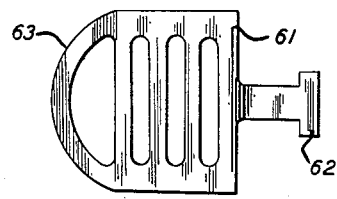
Figure 3 is a plan view of a connecting member.

An improved mounting for safety belt assembly constructions is shown in perspective in Figure 2 and is used in this embodiment for connecting the front seat belts assemblies. Mountings 41, 42, 43, 44 are of the type pictured in Figure 2. In Figure 2 it is seen that bracket support 65 is bolted or otherwise fastened to clamp 66 which is on the opposite side of floor panel 21. This construction offers a large degree of support in resistance to forces on bracket 65 and/or clamp 66. Clamp 66 has elliptical opening 67 with groove 68 extending beyond the major axis thereof. Spring 70 is attached at one end to floor panel 21 and exerts an outward force towards clamp 66. Eyelet 71 in carpet 72 provides an opening to the elliptical configuration so that T-shaped end 62 of connector 61 may be inserted therein.

T-shaped connector end 62 is inserted into elliptical configuration 67 with the end of the T aligned with groove 68. Upon a slight pressure, the connector end may be forced into the groove when spring 70 contacts it. The T-shaped end may now be turned 90° in either direction and due to the spring force of spring 70 connector end 62 is firmly held in place beneath clamp 66. This connection provides a sure, semi-rigid relationship between connector end 62 and clamp 66 and at the same time may be easily installed and detached. Due to the connector assembly, eyelet 71 may be of a relatively small diameter and therefore provide an attractive outward appearance when the connector belts are detached. This assembly therefore may be installed in any automobile and due to its configuration will not detract from the appearance thereof and therefore would not be objectionable even in those automobiles where safety belts would not be used. This permits a large scale production and adaptation of the connector assembly thereby reducing costs and promoting safety belt use.

The angle of the line connecting the supporting bolts 69 of clamp 66 is approximately that of a fastened seat belt. Due to this and the fact that the fastened surface of clamp 66 is in a plane that is closely parallel to the line of force exerted by a seat belt larger forces may be exerted upon the assembly without shear or fracture. For extra support it is within the scope of this invention to fasten clamp 66 through not only to floor panel 21 but also through side frame rail 22.

It will be understood that the invention is not to be limited to the exact construction shown and described, but that various changes and modifications may be made without departing from the spirit and scope of the invention, as defined in the appended claims.

What is claimed is:

1. In an automobile safety belt assembly that improvement comprising in combination mountings, longitudinal frame members, a longitudinal central frame member, safety belts, safety belt connecting means, a mounting being placed on each of said longitudinal frame members, a mounting being placed on either side of said longitudinal central frame member, said mountings being substantially aligned with the lower rear edge of seat members with which safety belt assembly is to be used, said mounting comprising a raised portion, said raised portion having elliptical cutouts with grooves extending along the major axis thereof, said major axis and groove being approximately aligned with the safety belt when in operating position, spring means, said spring means being located between said raised portion and the longitudinal member to which said raised portion is mounted, T-shaped belt ends, said belt ends being fastened to the end of said seat belts, said belt ends being designed to be inserted into said grooves contacting said spring means so that said belt ends upon being depressed and turned approximately ninety degrees will be substantially locked in said raised portion, said spring means exerting a pressure on said belt end to hold said belt end in constant relative position to said raised portion, said raised portion being accessible through the automobile floor coverings thereby providing an even, attractive surface.

2. The assembly and improvement claimed in claim 1 which is further characterized by a shoulder harness, said shoulder harness being attached to said T-shaped belt end at one of its ends and slidingly attached to said safety belt at the other of its ends.

References Cited in the file of this patent
UNITED STATES PATENTS

| | | |
|---|---|---|
| 2,263,348 | Barros | Nov. 18, 1941 |
| 2,280,694 | Embree et al. | Apr. 21, 1942 |
| 2,365,625 | Carlisle | Dec. 19, 1944 |
| 2,710,649 | Griswold et al. | June 14, 1955 |
| 2,716,561 | Beran | Aug. 30, 1955 |
| 2,798,539 | Johnson | July 9, 1957 |

OTHER REFERENCES

"Ford Field," for September 1954, vol. 56, No. 9, pp. 16 and 34, article on Safety Belts by Thomas Howe.

"Ford Field," for July 1955, vol. 57, No. 7, p. 23, article on Sparton "Karbelts."